May 2, 1933.  W. H. ROBERTSON  1,907,007
TIRE SPREADER
Filed June 18, 1927   2 Sheets-Sheet 1

INVENTOR
William H. Robertson
BY
Erwin, Wheeler & Woolard
ATTORNEYS

May 2, 1933.  W. H. ROBERTSON  1,907,007
TIRE SPREADER
Filed June 18, 1927   2 Sheets-Sheet 2
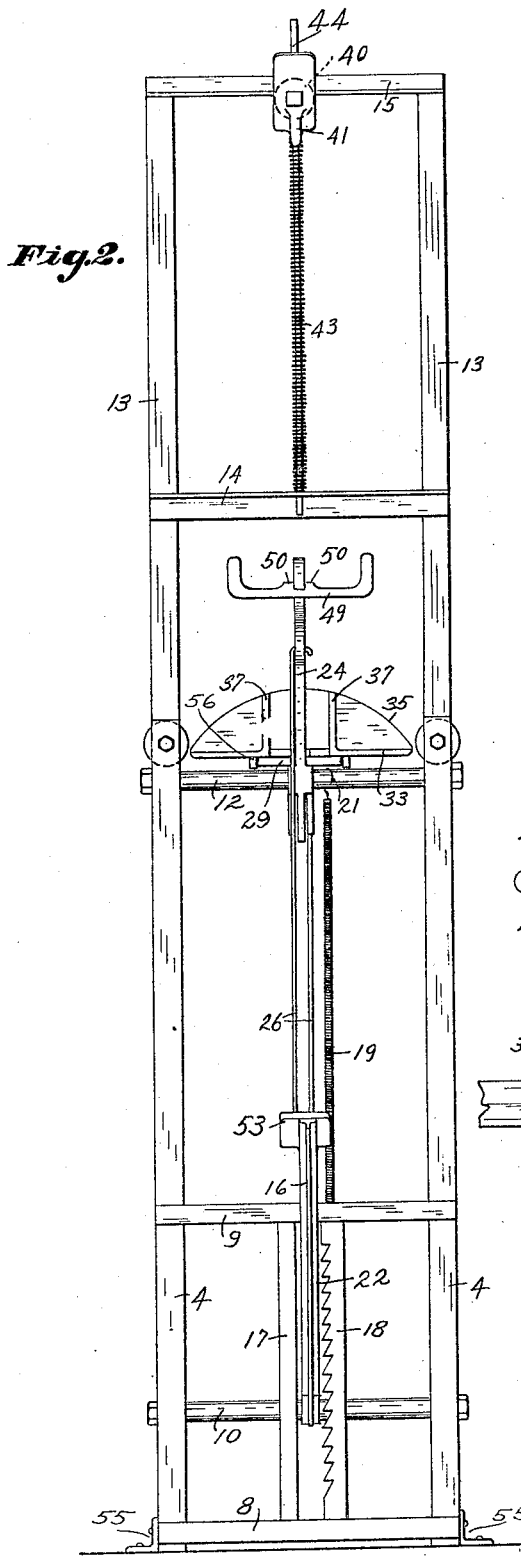
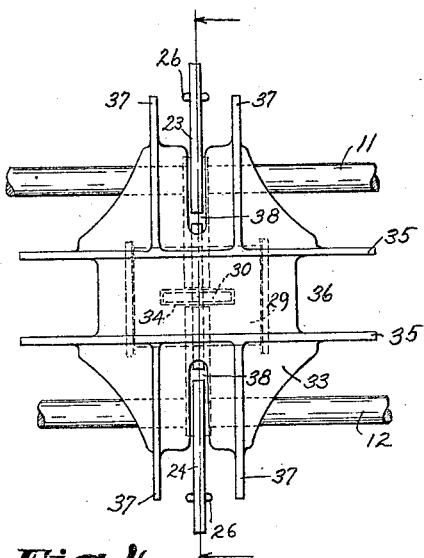
Fig. 3.
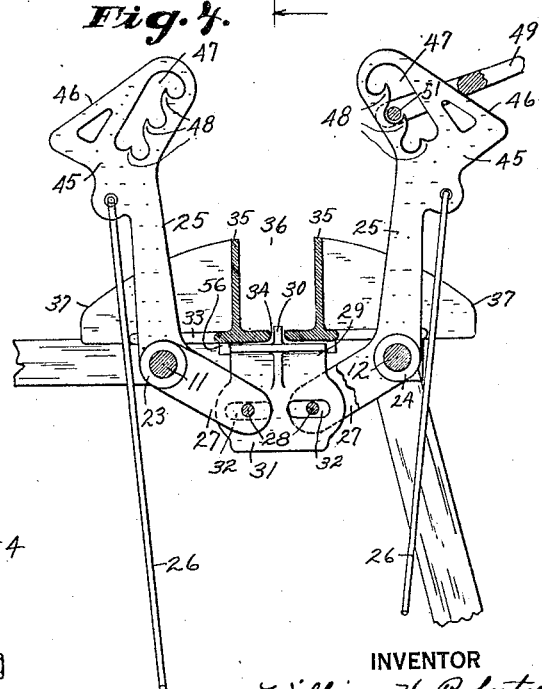
Fig. 4.
INVENTOR
William H. Robertson
BY
Erwin, Wheeler & Woolard
ATTORNEYS Patented May 2, 1933

1,907,007

UNITED STATES PATENT OFFICE

WILLIAM H. ROBERTSON, OF ROCKFORD, ILLINOIS

TIRE SPREADER

Application filed June 18, 1927. Serial No. 199,714.

This invention relates to improvements in tire spreaders.

It is the principal object of this invention to provide in a tire spreader having a pair of bead engaging levers simultaneously movable in opposite directions and interconnected with a segmental plate engageable with the tread of a tire and simultaneously movable vertically relative to the direction of movement of the levers, the levers and plate being operable from a single source of power.

Another object is to provide the levers with bead engaging hooks adjustable on their respective levers to engage the bead of any sized tire.

It is a further object to provide between the levers and their respective hooks an adjustable connection comprising on each lever a series of teeth engageable with a bar on the hook associated therewith and so shaped as to prevent the bar from being disengaged with the teeth except by manual operation.

A still further object is to provide an improved tire tread engaging segmental plate which will provide for a tire, normally shaped, an aligning channel for supporting the tire in proper position relative to the spreader mechanism while the latter is being adjusted, and to further provide a simple supporting or lifting plate for the segmental plate which may be readily removed therefrom.

Other objects will become apparent as the description of the drawings progresses.

In the drawings:

Figure 2 is a front elevation of the device shown in Figure 1.

Figure 3 is a top plan view of a portion of the spreader.

Figure 4 is a side elevation partly in section of a portion of the spreader.

Like parts are identified by the same reference characters throughout the several views.

Figure 1:
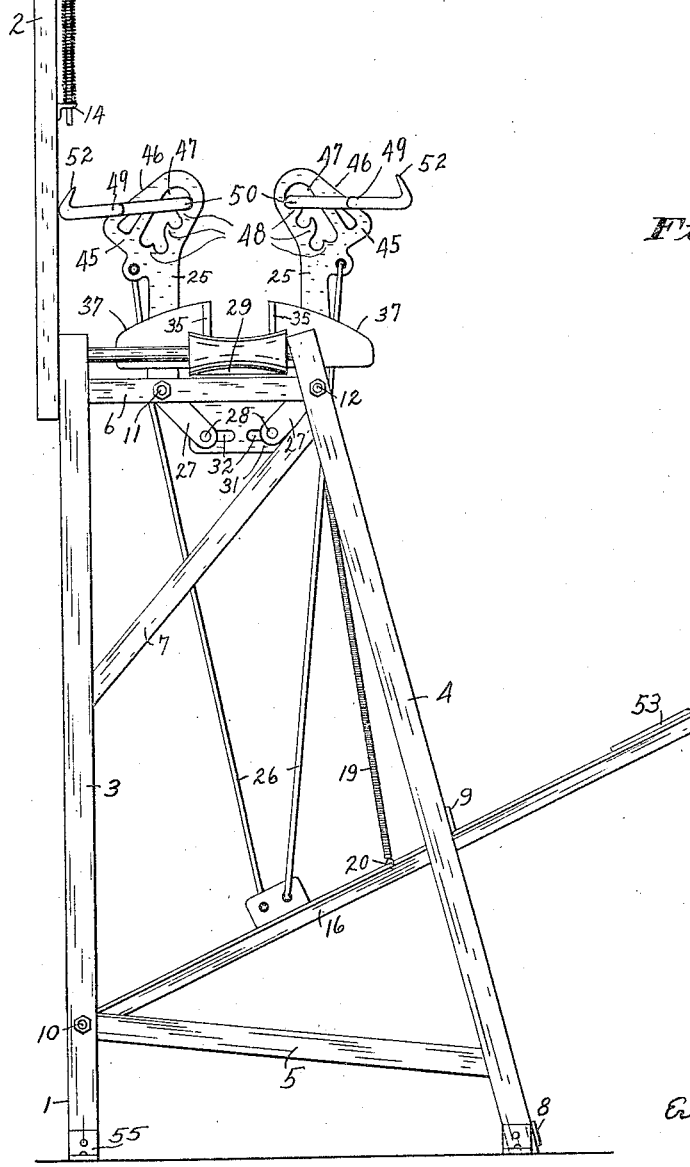
Figure 1 is a side elevation of the tire spreader.
Figure 5:
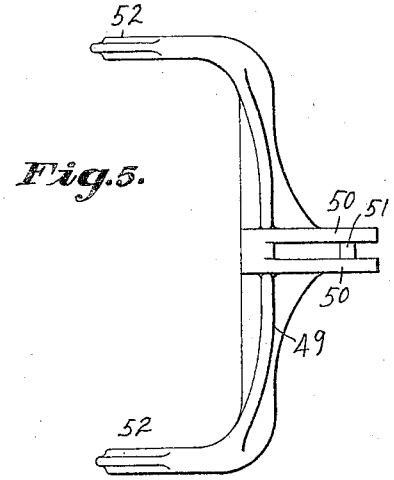
Figure 5 is a plan view of one of the bead engaging hooks.

The spreader frame comprises a base portion 1 and an upright standard 2 extending upwardly from the rear of base portion 1. The base portion comprises rear legs 3, front legs 4 inclined upwardly toward the rear legs, lower beams 5 connecting the front and rear legs, upper beams 6 connecting the upper ends of the front and rear legs, bracing beams 7 extending in inclined relation to and connected with the front and rear legs, cross bars 8 and 9 connecting the front legs, shaft 10 connecting the lower portions of rear legs 3, shaft 11 connecting upper beams 6, and shaft 12 connecting the upper ends of front legs 4. The upright standard 2 comprises vertical bars 13 connected by lower angle iron 14 and upper angle iron 15. The vertical bars 13 are each secured in any desired manner to the rear legs 3.

Mounted for oscillation on shaft 10 is a foot lever 16 which extends forwardly of the base portion 1 and is guided by guide bar 17 and ratchet bar 18 each connected to and extending between cross bars 8 and 9. The lever 16 is normally held in its position shown by spring 19 secured at 20 to the lever and at 21 to the shaft 12. As will be noted the lever 16 is T-shaped in cross section. Thus when the lever is moved downwardly, one of the lateral margins 22 of the lever may be positioned in contact with a tooth of the ratchet bar 18 to hold such lever against return to its normal position shown.

Mounted for oscillation on shafts 11 and 12, respectively, are bell crank levers 23 and 24, arms 25 of which are each connected to foot lever 16 by a link 26. Each of levers 23 and 24 are provided with a pair of parallel arms 27 spaced apart and connected by pin 28. Supported by the pins 28 is a plate 29 having a segmental lug 30 extending vertically upwardly therefrom and having also a guide plate 31 extending vertically downwardly therefrom. The guide plate 31 is positioned between arms 27 of each lever 23 and 24 and is provided with a pair of elongated apertures 32 each slidably receiving a pin 28.

Removably positioned upon and supported by the plate 29 is a tire tread engaging plate 33 having an arcuate slot 34 loosely receiving the segmental lug 30. The plate 33 is provided with segmental ribs 35 spaced apart to provide a channel 36. Extending laterally of each rib 35 is a pair of similar ribs 37 spaced from each other. Between each of the pairs of ribs 37, the plate 33 is provided with a slot 38 within which the levers 23 and 24 are respectively positioned.

Directly above the tire spreading mechanism previously described is a tire support which comprises a roller 40 supported at each end by a bracket 41 having an arm 42 which is supported by spring 43 disposed about rod 44. Arm 42 is secured to rod 44 by a set screw 44' and rod 44 is slidably mounted at each end respectively in angle irons 14 and 15. It is preferred that the spring 43 be of sufficient strength to hold a tire uprightly when the tread of such tire is resting on the ribs 35 of the plate 33. In other words the spring should not be of sufficient strength to support a tire without the assistance of the plate 33.

The lever arms 25 of each of the levers 23 and 24 are each provided with ratchet ends 45 each having an inclined margin 46 and a toothed aperture 47 provided with teeth 48 curved upwardly relative to the arms 25 and in spaced relation to each other. Mounted on the ratchet end 45 of each lever is a forked hook 49 having prongs 50 receiving the end 45 and provided with a pin 51 extending through aperture 47 and adapted to be seated in association with either of the teeth 48. The upward curve of the teeth 48 prevents the pin 50 from jumping out of any given position with relation to the teeth.

It will be noted that the ribs 35 and 37 of the tread engaging plate 33 are provided with marginal faces disposed in a substantially spherical plane. The function of the spherical marginal faces of the ribs 35 and 37 will be understood as the operation of the device is explained.

When it is desired to spread a tire, such tire will be suspended on roller 40 which will be raised or lowered to place it with the tread of the tire resting upon the ribs 35 of the tread plate 33. The hooks 49 will then be adjusted in relation to the arms 25 as previously indicated and prongs 52 of the hooks will be moved to engage the inner margins of the beads of the tire. With this adjustment of the spreader mechanism accomplished, the foot lever 16 may be operated by placing one's foot upon the foot pedal 53 and forcing it down. The downward movement of foot lever 16 will, through links 26, cause the lever arms 25 to move divergently which in turn will through hooks 49 pull the beads of the tire immediately adjacent the latter hooks away from each other. As the arms 25 are moved to spread the beads of a tire, the arms 27 of the levers 23 and 24 will move inwardly and upwardly which through pins 28 will cause the supporting plate 29 to raise the tread plate 33 upwardly.

Thus as the beads of a tire are relatively spread, the tread of such tire will be forced upwardly by the ribs 35 and 37 and the tread will be held in an inverted position upon the curved margins of the ribs, thereby exposing the inner wall of the tire for inspection and repair. When the inner wall of the tire is thus exposed the spreader mechanism may be secured in spreading position by engaging the foot lever with the ratchet bar 18 as previously indicated.

It is preferred that the rear legs 3 of the base be provided with brackets 55 adapted to be anchored to a floor in any suitable manner. Additional means may be provided on plate 33 for maintaining such plate in position upon the supporting plate 29 and as shown may comprise ribs 56 upon the under side of plate 33 spaced apart to receive plate 29 between them and positioned relatively at the end of slot 34 in plate 33.

I claim:

1. In a tire spreader, a pair of co-operating levers mounted for simultaneous pivotal movement, means on said levers for engaging the bead of a tire, a foot lever, links connecting said foot lever with said co-operating levers, a movable tire tread engaging plate supported by said pair of levers, whereby when said foot lever is operated the beads of a tire may be spread and the tread thereof inverted.

2. In a tire spreader, a pair of levers movable in opposition to each other, means on said levers for engaging the beads of a tire, a tire tread engaging plate movable into pressure engagement with a tire mounted thereon, said plate supported by said levers being provided with ribs having arcuate margins for engaging said tread, and means for operating said levers and plate simultaneously.

3. In a tire spreader, a pair of levers each having a tire bead engaging arm and a second arm, a tread engaging plate movable vertically relative to said levers, means connecting said second arms and said plate, said means including a pin on each of said second arms in slidable bearing connection with said plate, and means for operating said levers in opposition.

4. In a tire spreader, a movable tire tread engaging plate having ribs provided with arcuate tire tread engaging margins, means for spreading the beads of a tire said means being connected with said plate for simultaneous movement thereof.

5. In a tire spreader, a tire tread engaging plate having ribs provided with arcuate tire tread engaging margins, certain of said ribs being spaced to provide a channel for guiding a tire supported by the plate, and means for spreading the beads of a tire supported by said plate.

6. In a tire spreader having a frame, the combination with a foot lever pivoted to said frame, of a tire tread engaging plate, a pair of levers pivotally mounted intermediate their ends on said frame to provide arms supporting said plate and arms for engaging a tire bead, and tire engaging hooks pivotally mounted on said last mentioned arms.

7. In a tire spreader, a pair of levers movable in opposition to each other and each having an apertured end provided with a plurality of teeth within said aperture, and a tire bead engaging hook on each of said levers extending through said aperture and alternatively engageable with said teeth.

8. In a tire spreader, a tire tread support comprising a plurality of widely spaced members having openings of substantial depth therebetween and exposed upper surfaces constituting a generally convex skeleton form adapted to bulge a tire tread inwardly while permitting a tire repair tool to work through the tread between said members.

9. In a tire spreader, a tread bulging device comprising a pair of widely spaced longitudinally extending members having convex upper surfaces, means connecting said members to provide an opening of substantial depth therebetween, and secondary members disposed transversely with respect to the first mentioned members to project in opposite directions from the space therebetween, said secondary members being also convex in a transverse direction and so connected to said first mentioned members as to provide substantial working space for tire tools, all of said members comprising a skeleton support for a tire tread adapted to bulge it inwardly without interfering with the operation of a tire tool through the tread.

10. In a tire spreader, a tire bulging device comprising a plate provided integrally with longitudinally extending ribs extending high above the plate at their centers and decreasing in height toward their respective ends, and a plurality of transverse ribs joined at their ends to intermediate portions of respective longitudinal ribs and extending laterally outwardly therefrom in mutually spaced relation and with decreasing height, said ribs together comprising a skeleton support adapted to permit a tire tool to pass through the tread of a tire between the ribs while the tire is supported thereon.

11. In a tire spreader, the combination with a tire engaging hook having a pivot member, of a movable arm for actuating said hook provided with a slot in which said pivot member is adjustable, and marginal recesses opening into said slot into which said pivot member is receivable to fix its position of longitudinal adjustment in the slot.

12. In a tire spreader, the combination with a tire engaging hook having a pivot member, of a movable arm for actuating said hook provided with a slot in which said pivot member is adjustable and marginal recesses opening into said slot into which said pivot member is receivable to fix its position of longitudinal adjustment in the slot, and upwardly curving fingers between the marginal recesses of said arm adapted to retain the pivot of said hook during pivotal movement of the hook to and from its position of tire engagement.

13. In a tire spreader, the combination with a tread support and a bead engaging hook provided with a transverse pivot pin upon which said hook is adjustable between an inoperative position and a position for engagement of a bead, of a supporting and actuating arm for said hook pivoted adjacent the tread support and provided in an oscillatory portion with a slot extending in a generally longitudinal direction and in which said pin is adjustable, the margin of said arm at one side of the slot therein having upwardly curving fingers between which said pin is receivable in a plurality of adjustments of said hook, the shape of each finger being adapted to retain the pin in its given adjustment during movement of the hook between its operative and inoperative positions.

14. A tire spreader comprising a standard, brackets mounted upon said standard, rocker arms pivotally mounted intermediate their length upon said brackets, tire casing engaging and spreading means pivotally connected to said rocker arms at a point above their pivotal support, a tire supporting plate operatively connected to said rocker arms at a point below their pivotal support, operating arms attached to said rocker arms at a point above their pivotal support, and means to exert a downward pull upon said operating arms for causing the tire engaging means to pull downwardly and outwardly upon the sides of the tire casing and the tire supporting plate to be lifted upwardly against the tire casing.

15. A tire spreader comprising a standard upon which is both horizontally and pivotally supported a pair of rocker arms, a tire casing supporting plate slidably mounted in respect to said standard, means carried by said rocker arms for engaging the inner edges of the tire casing, operative connection between the lower ends of the rocker arms and the casing supporting plate, operating arms attached to said rocker arms at a point above their pivotal support, and means to exert a downward pull upon said operating arms for rotating the rocker arms, whereby the upper ends of the rocker arms are pulled outwardly and downwardly and the lower ends of the rocker arms are swung upwardly.

16. A tire spreader comprising a standard, rocker arms pivotally supported upon said standard, hook arms operatively connected with said rocker arms, a plurality of hooks carried by said hook arms in overlapping relation, and means for actuating said rocker arms for rotating them upon their supports and causing said hooks to be pulled outwardly and downwardly for spreading the tire casing.

WILLIAM H. ROBERTSON.